(12) United States Patent
Go et al.

(10) Patent No.: US 12,463,845 B2
(45) Date of Patent: Nov. 4, 2025

(54) RELAY DEVICE, RELAY SYSTEM, RELAYING METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Darmawan Go, Yokkaichi (JP); Tomohiro Otsu, Yokkaichi (JP); Yoshitaka Kikuchi, Yokkaichi (JP); Takeshi Hagihara, Yokkaichi (JP); Hirofumi Urayama, Yokkaichi (JP); Hideki Maeda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/571,571

(22) PCT Filed: Jun. 14, 2022

(86) PCT No.: PCT/JP2022/023801
§ 371 (c)(1),
(2) Date: Dec. 18, 2023

(87) PCT Pub. No.: WO2023/276657
PCT Pub. Date: Jan. 5, 2023

(65) Prior Publication Data
US 2024/0283676 A1 Aug. 22, 2024

(30) Foreign Application Priority Data
Jun. 30, 2021 (JP) .................................. 2021-108233

(51) Int. Cl.
*H04L 12/46* (2006.01)
*H04L 9/40* (2022.01)
*H04L 12/40* (2006.01)

(52) U.S. Cl.
CPC .... *H04L 12/4604* (2013.01); *H04L 12/40006* (2013.01); *H04L 63/1466* (2013.01)

(58) Field of Classification Search
CPC ............ H04L 63/1466; H04L 12/4604; H04L 12/40006
See application file for complete search history.

(56) References Cited

U.S. PATENT DOCUMENTS

2019/0357146 A1* 11/2019 Kim .................. H04W 52/0274
2020/0204397 A1   6/2020 Inoue
(Continued)

FOREIGN PATENT DOCUMENTS

JP         2001-060907 A    3/2001

OTHER PUBLICATIONS

Sergio et al., "Optimizing Dual-Mode IEEE Interfaces: Deep-Sleep is Healthy", IEEE Transactions on Communications vol. 65, Issue 8), Aug. 2017, IEEE Publishing.*

(Continued)

*Primary Examiner* — Todd L Barker
(74) *Attorney, Agent, or Firm* — Honigman LLP

(57) ABSTRACT

A vehicle-mounted relay device for relaying Ethernet frames includes a plurality of PHY units corresponding to a plurality of vehicle-mounted devices, a switch unit to which the plurality of PHY units are connected, and a control unit configured to monitor operating states of the plurality of PHY units. The plurality of PHY units include a predetermined PHY unit whose operating state switches between a sleep state and an active state in response to reception of a predetermined control signal that differs from the Ethernet (Continued)

frames. When an Ethernet frame to be transmitted from the predetermined PHY unit has been detected during a period where the predetermined PHY unit is in the sleep state, the control unit executes switching control to switch the predetermined PHY unit to the active state.

16 Claims, 7 Drawing Sheets

(56) References Cited

U.S. PATENT DOCUMENTS

| | | | | |
|---|---|---|---|---|
| 2020/0326771 | A1* | 10/2020 | Wu | H04L 12/40039 |
| 2021/0243046 | A1* | 8/2021 | Tada | H04L 12/40013 |
| 2022/0393894 | A1 | 12/2022 | Xian et al. | |

OTHER PUBLICATIONS

Tramarin et al., "Energy Efficient Ethenret for Industrial Communication Scenario", 2013 IEEE 18th Conference on Emerging Technologies and Factory Automation, Oct. 24, 2013.*
Norbert et al., "Energy Consumption of Ethernet compared to automotive bus networks", 2011 Proceedings of the Ninth International Workshop on Intelligent Solutions in Embedded Systems, Jul. 1, 2011.*
Herreria-Alonso , "Optimizing dual mode IEEE InterfacesL Deep-sleep is healthy" IEEE Transactions on Communications, vol. 65, ISsue:8, Aug. 2017.*
International Search Report, Application No. PCT/JP2022/023801, mailed Sep. 13, 2022. ISA/Japan Patent Office.

* cited by examiner

RELAY DEVICE, RELAY SYSTEM, RELAYING METHOD, AND COMPUTER PROGRAM

CROSS-REFERENCE TO RELATED APPLICATIONS

This application is the U.S. national stage of PCT/JP2022/023801 filed on Jun. 14, 2022, which claims priority of Japanese Patent Application No. JP 2021-108233 filed on Jun. 30, 2021, the contents of which are incorporated herein.

TECHNICAL FIELD

The present disclosure relates to a relay device, a relay system, a relaying method, and a computer program.

BACKGROUND

A vehicle-mounted network including a plurality of ECUs (Electronic Control Units) and a relay device that relays frames transmitted and received between the plurality of ECUs is known. ECUs may be placed in a sleep state to suppress power consumption. Since an ECU in the sleep state is incapable of receiving a frame, there is a need for technology capable of waking up an ECU that is in a sleep state in a timely manner.

As one example, JP 2021-72568A discloses a technology for waking up a master vehicle-mounted communication device (ECU) that is in a sleep state from a slave vehicle-mounted communication device (relay device) on a network that is compliant with 100Base-T1 communication protocol. When the master vehicle-mounted communication device is in the sleep state, the slave vehicle-mounted communication device does not output a signal (or "idle signal") for waking up the master vehicle-mounted communication device.

For this reason, in JP 2021-72568A, a predetermined signal with almost the same pattern as the idle signal is transmitted from the slave vehicle-mounted communication device to the master vehicle-mounted communication device. When a detection circuit, which is included in the master vehicle-mounted communication device and continues to operate even in the sleep state, has detected this predetermined signal, the detection circuit outputs a predetermined power supply instruction signal to a power supply circuit. As a result, the master vehicle-mounted communication device wakes up.

The relay device includes a PHY (Physical Layer) unit for each of a plurality of ECUs. As one example, a PHY unit is switched from an active state to the sleep state when the corresponding ECU enters the sleep state. Since a PHY unit in the sleep state cannot transmit and receive frames, the relay device is conventionally incapable of relaying frames destined for an ECU in the sleep state.

The present disclosure was conceived in view of such problems and has an object of providing a relay device, a relay system, a relaying method, and a computer program capable of relaying in a timely manner while suppressing power consumption.

SUMMARY

A relay device according to an aspect of the present disclosure is a vehicle-mounted relay device for relaying Ethernet frames includes: a plurality of PHY units corresponding to a plurality of vehicle-mounted devices; a switch unit to which the plurality of PHY units are connected; and a control unit configured to monitor operating states of the plurality of PHY units, wherein the plurality of PHY units include a predetermined PHY unit whose operating state switches between a sleep state and an active state in response to reception of a predetermined control signal that differs from the Ethernet frames, and when an Ethernet frame to be transmitted from the predetermined PHY unit has been detected during a period where the predetermined PHY unit is in the sleep state, the control unit executes switching control to switch the predetermined PHY unit to the active state.

A relaying method according to an aspect of the present disclosure is a relaying method in which a vehicle-mounted relay device relays Ethernet frames, wherein the relay device includes: a plurality of PHY units that correspond to a plurality of vehicle-mounted devices and include a predetermined PHY unit whose operating state is switched between a sleep state and an active state in response to reception of a predetermined control signal that differs from the Ethernet frames; and a switch unit to which the plurality of PHY units are connected, the relaying method including steps of detecting an Ethernet frame to be transmitted from the predetermined PHY unit during a period in which the predetermined PHY unit is in the sleep state; and switching the predetermined PHY unit to the active state when the Ethernet frame has been detected.

A computer program according to an aspect of the present disclosure is a computer program for enabling a vehicle-mounted relay device to relay Ethernet frames, wherein the relay device includes: a plurality of PHY units that correspond to a plurality of vehicle-mounted devices and include a predetermined PHY unit whose operating state is switched between a sleep state and an active state in response to reception of a predetermined control signal that differs from the Ethernet frames; and a switch unit to which the plurality of PHY units are connected, the computer program providing a computer with steps of detecting an Ethernet frame to be transmitted from the predetermined PHY unit during a period in which the predetermined PHY unit is in the sleep state; and switching the predetermined PHY unit to the active state when the Ethernet frame has been detected.

Advantageous Effects

According to an aspect of the present disclosure, it is possible to relay in a timely manner while suppressing power consumption.

DETAILED DESCRIPTION OF PREFERRED EMBODIMENTS

Figure 1:
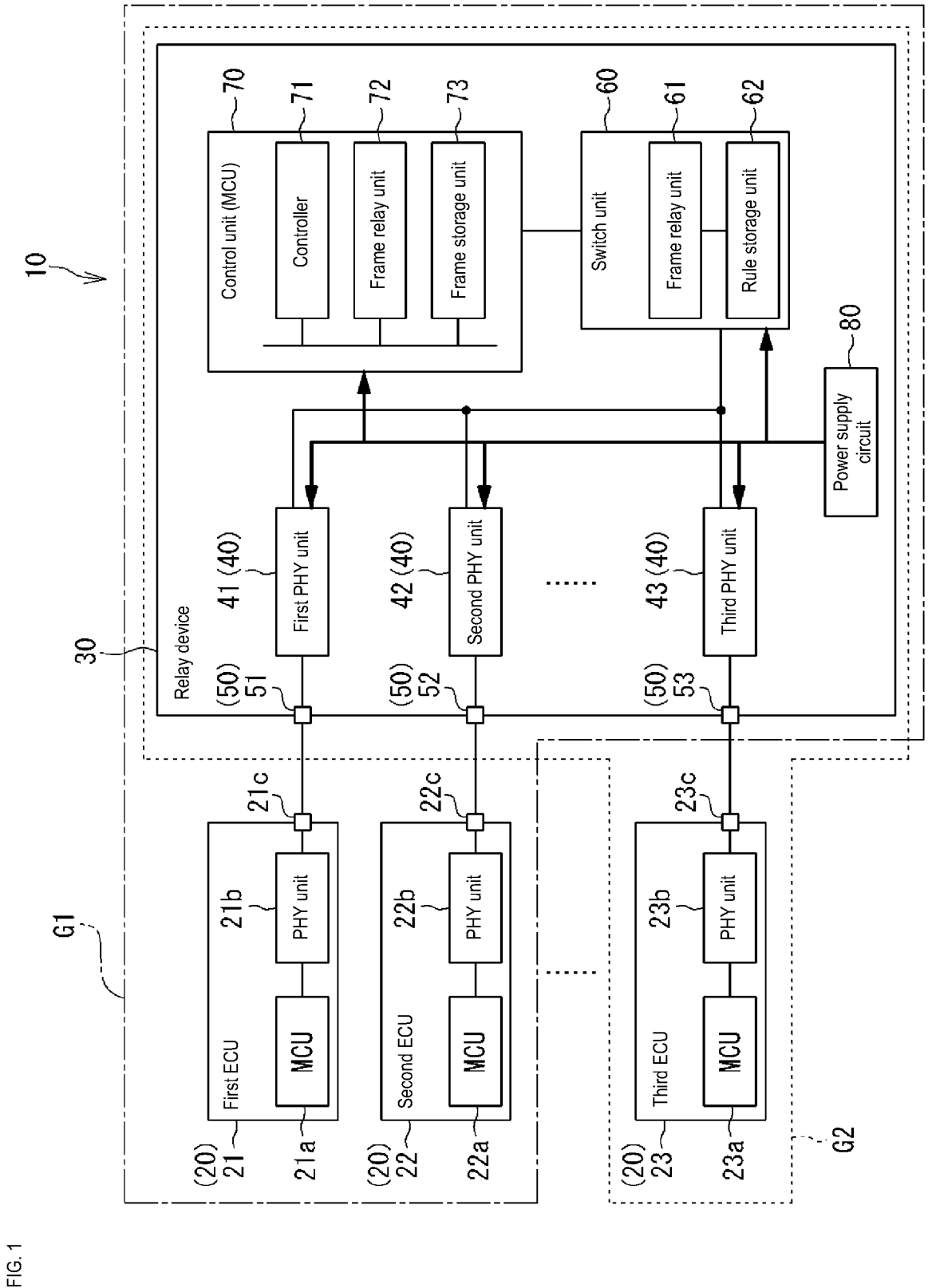
FIG. 1 is a block diagram depicting the configuration of a relay system according to an embodiment of the present disclosure.

Configurations included in the embodiments of the present disclosure are described below in brief.

A relay device according to an aspect of the present disclosure is a vehicle-mounted relay device for relaying Ethernet frames including: a plurality of PHY units corresponding to a plurality of vehicle-mounted devices; a switch unit to which the plurality of PHY units are connected; and a control unit configured to monitor operating states of the plurality of PHY units, wherein the plurality of PHY units include a predetermined PHY unit whose operating state switches between a sleep state and an active state in response to reception of a predetermined control signal that differs from the Ethernet frames, and when an Ethernet frame to be transmitted from the predetermined PHY unit has been detected during a period where the predetermined PHY unit is in the sleep state, the control unit executes switching control to switch the predetermined PHY unit to the active state.

With the above configuration, since it is possible to wake up a PHY unit when necessary, it is possible to relay in a timely manner, while suppressing power consumption by placing the PHY unit in the sleep state as appropriate.

It is preferable for the control unit to include a frame storage unit configured to store the Ethernet frame to be transmitted from the predetermined PHY unit, and after executing the switching control, for the control unit to execute transfer control for outputting the Ethernet frame stored in the frame storage unit to the predetermined PHY unit.

With the above configuration, it is not necessary to retransmit an Ethernet frame from a vehicle-mounted device to the relay device. This means that it is possible to reduce the communication load involved in retransmission of Ethernet frames.

After executing the switching control, it is preferable for the control unit to execute retransmission request control to request a transmitter of the Ethernet frame to retransmit the Ethernet frame to be transmitted from the predetermined PHY unit.

With the above configuration, it is possible to reduce the processing load at the relay device.

It is preferable for the switching control and the transfer control to be executed on a condition that the Ethernet frame to be transmitted from the predetermined PHY unit satisfies a first predetermined condition.

With the above configuration, switching control and transfer control are executed only when the first predetermined condition is satisfied, for example, when there is a high need for transferring, and the predetermined PHY unit is kept in the sleep state and transferring of an Ethernet frame is not performed when the first predetermined condition is not satisfied. By doing so, it is possible to suppress power consumption at the relay device, such as when there is a low need for transferring.

It is preferable for the first predetermined condition to include a condition that a priority, which relates to driving safety of a vehicle, of the data included in the Ethernet frame to be transmitted from the predetermined PHY unit is a predetermined level or higher.

With the above configuration, it is possible to determine which Ethernet frames have a high need for transferring based on the priority mentioned above.

It is preferable, when the Ethernet frame to be transmitted from the predetermined PHY unit satisfies a second predetermined condition, for the control unit to execute retransmission request control to request a transmitter of the Ethernet frame to retransmit the Ethernet frame without executing the transfer control.

With the above configuration, since it is possible to switch between performing transfer control and performing retransmission request control according to whether the second predetermined condition is satisfied, it is possible to relay Ethernet frames favorably and more in keeping with various conditions.

It is preferable for the second predetermined condition to include: the type of data included in the Ethernet frame to be transmitted from the predetermined PHY unit being a predetermined type; an amount of data in the Ethernet frame to be transmitted from the predetermined PHY unit exceeding a predetermined amount; or the Ethernet frame to be transmitted from the predetermined PHY unit being one of a plurality of divided frames.

By setting conditions for when retransmission of an Ethernet frame is preferable to proxy transmission of the frame as the second predetermined condition, it is possible to relay Ethernet frames favorably and more in keeping with various conditions.

It is preferable for the switch unit to include a rule storage unit configured to store a rule for deciding whether the Ethernet frame to be transmitted from the predetermined PHY unit is to be outputted from the switch unit to the control unit, and for the control unit to change, when the predetermined PHY unit is in the sleep state, the rule so that the Ethernet frame to be transmitted from the predetermined PHY unit is outputted to the control unit.

By changing a rule, it becomes possible to output an Ethernet frame, which could not be outputted to the control unit before the change, to the control unit. This enables the control unit to peek (snoop) into the content of an Ethernet frame that could not be monitored before the rule was changed.

It is preferable for the Ethernet frame to be transmitted from the predetermined PHY unit to be a frame whose transmitter is a vehicle-mounted device belonging to the same VLAN (Virtual Local Area Network) as a vehicle-mounted device corresponding to the predetermined PHY unit out of the plurality of vehicle-mounted devices.

In this case, an Ethernet frame to be transmitted from the predetermined PHY unit can be relayed by the switch unit as an L2 switch, so that the Ethernet frame will normally not be outputted to the control unit. In this case, for the control unit to perform switching control based on the content of the Ethernet frame, it is necessary to perform a rule change as described in (8) above so that the control unit can peek at the content of the Ethernet frame.

It is preferable for the Ethernet frame to be transmitted from the predetermined PHY unit to be a frame whose transmitter is a vehicle-mounted device belonging to a VLAN (Virtual Local Area Network) that differs from the vehicle-mounted device corresponding to the predetermined PHY unit out of the plurality of vehicle-mounted devices.

In this case, an Ethernet frame to be transmitted from the predetermined PHY unit is outputted to the control unit as an L3 switch. In this case, for the control unit to perform switching control based on the content of the Ethernet frame, it is unnecessary to perform a rule change as described in (8) above.

It is preferable for the predetermined PHY unit to be compliant with OPEN Alliance TC10 (Technical Committees 10).

With this configuration, since the predetermined PHY unit generates and outputs a predetermined control signal to wake up the vehicle-mounted device corresponding to the predetermined PHY unit, the control unit does not need to generate a predetermined control signal to wake up the vehicle-mounted device, which makes it possible to reduce the processing load at the control unit.

A relay system according to an aspect of the present disclosure includes a relay device according to any one of (1) to (11) above and the plurality of vehicle-mounted devices.

A relaying method according to an aspect of the present disclosure is a relaying method where a vehicle-mounted relay device relays Ethernet frames, wherein the relay device includes: a plurality of PHY units that correspond to a plurality of vehicle-mounted devices and include a predetermined PHY unit whose operating state is switched between a sleep state and an active state in response to reception of a predetermined control signal that differs from the Ethernet frames; and a switch unit to which the plurality of PHY units are connected, the relaying method including steps of detecting an Ethernet frame to be transmitted from the predetermined PHY unit during a period in which the predetermined PHY unit is in the sleep state; and switching the predetermined PHY unit to the active state when the Ethernet frame has been detected.

With the above configuration, since it is possible to wake up a PHY unit when necessary, it is possible to relay in a timely manner, while suppressing power consumption by placing the PHY unit in the sleep state as appropriate.

A computer program according to an aspect of the present disclosure enables a vehicle-mounted relay device to relay Ethernet frames, wherein the relay device includes: a plurality of PHY units that correspond to a plurality of vehicle-mounted devices and include a predetermined PHY unit whose operating state is switched between a sleep state and an active state in response to reception of a predetermined control signal that differs from the Ethernet frames; and a switch unit to which the plurality of PHY units are connected, the computer program providing a computer with steps of detecting an Ethernet frame to be transmitted from the predetermined PHY unit during a period in which the predetermined PHY unit is in the sleep state; and switching the predetermined PHY unit to the active state when the Ethernet frame has been detected.

With the above configuration, since it is possible to wake up a PHY unit when necessary, it is possible to relay in a timely manner, while suppressing power consumption by placing the PHY unit in the sleep state as appropriate.

Specific embodiments of the present disclosure will now be described in detail with reference to the drawings.

Configuration of Relay System

FIG. 1 is a block diagram depicting the configuration of a relay system 10. In FIG. 1, thin lines connecting parts of the relay system 10 represent communication lines, and thick lines connecting parts of the relay system 10 represent power feeder lines.

The relay system 10 is a vehicle-mounted system installed in a vehicle, such as an automobile. The relay system 10 includes a plurality of vehicle-mounted devices 20 and a relay device 30.

As one example, the plurality of vehicle-mounted devices 20 are ECUs (Electronic Control Units). To distinguish between them, three predetermined vehicle-mounted devices 20 out of the plurality of vehicle-mounted devices 20 are referred to as appropriate as the "first ECU 21", the "second ECU 22", and the "third ECU 23". Provided that the number is at least two, there are no particular limitations on the number of vehicle-mounted devices 20 included in the relay system 10. In the relay system 10, one vehicle-mounted device 20 out of the first ECU 21, the second ECU 22, and the third ECU 23 may be omitted, or a fourth vehicle-mounted device 20 may be provided in addition to the named three vehicle-mounted devices 20.

The relay device 30 is connected to each of the plurality of vehicle-mounted devices 20 so as to be capable of communication and relays frames transmitted and received between the plurality of vehicle-mounted devices 20. In other words, a vehicle-mounted network is constructed by the plurality of vehicle-mounted devices 20 and the relay device 30.

The relay device 30 divides the plurality of vehicle-mounted devices 20 into a plurality of VLANs (Virtual Local Area Networks). The first ECU 21 and the second ECU 22 belong to the same VLAN group G1. The third ECU 23 belongs to a VLAN group G2 that differs from the group G1.

Frames

Frames that flow through the relay system 10 will now be described. These frames include "sleep control frames" and "Ethernet frames". The operating states of each unit included in the relay system 10 include a sleep state and an active state. To reduce power consumption, each unit is placed into the sleep state as appropriate. The expression "sleep state" here refers to a state where power consumption is suppressed below the active state by stopping or reducing the functions of at least some of the unit in question.

A sleep control frame is a frame including a sleep signal for placing a unit included in the relay system 10 into the sleep state or a wakeup signal for placing the unit into the active state. That is, a sleep control frame is a frame used for sleep control or wake-up control of each unit. Here, both a sleep signal and a wakeup signal are examples of "predetermined control signals" for the present disclosure.

As one example, a sleep control frame is an NM (Network Management) message that is compliant with a predetermined communication protocol. One example of this predetermined communication protocol is a protocol for performing sleep and wakeup control on a vehicle-mounted Ethernet (registered trademark).

An Ethernet frame is a frame that does not include a sleep signal or a wakeup signal (that is, a frame that does not include a predetermined control signal). In other words, an Ethernet frame is a frame that differs from a sleep control frame and is used for purposes aside from sleep control and wake-up control of units included in the relay system 10. When a unit receives an Ethernet frame, the unit is not subjected to sleep control or wake-up control with reception of the frame as a direct trigger. As one example, the Ethernet frame is a frame that is compliant with vehicle-mounted Ethernet. A specific example of an Ethernet frame will be described later.

Configuration of Vehicle-Mounted Device

As one example, the first ECU 21 is an ECU connected to a sensor (not illustrated) that measures the state of the vehicle. Example sensors include an onboard camera, LIDAR (Light Detection and Ranging), an ultrasonic sensor, and a millimeter-wave sensor. The first ECU 21 acquires measurement data from the sensor and generates frames F12 and F13 (examples of "Ethernet frames") that include the measurement data or data obtained by processing the measurement data. The first ECU 21 then transmits the frame F12 to the second ECU 22, and transmits the frame F13 to the third ECU 23.

The first ECU 21 includes an MCU (Micro Control Unit) 21a, a PHY (Physical Layer) unit 21b, and a port 21c. The MCU 21a is electrically connected to the PHY unit 21b, and the PHY unit 21b is electrically connected to the port 21c. The MCU 21a includes a computational processing unit and a memory. The computational processing unit reads out a predetermined computer program from a memory and executes the program to perform various types of computation and processing at the first ECU 21. As one example, the MCU 21a generates the frames F12 and F13 and outputs the frames F12 and F13 to the PHY unit 21b.

The PHY unit 21b is a physical layer transceiver that is compliant with OPEN Alliance TC10 (Technical Committees 10), and includes a detection circuit, a transmitter circuit, and a receiver circuit (none of which are illustrated). The detection circuit is a circuit for detecting a wakeup signal for waking up the PHY unit 21b.

The transmitter circuit and receiver circuit perform communication that is compliant with a predetermined communication protocol. An example predetermined communication protocol is 100 Base-T1 ("IEEE 802.3bw", where "IEEE" is a registered trademark). The transmitter circuit converts frames (for example, the frames F12 and F13) inputted from the MCU 21a into three-level signals and outputs such signals to the port 21c. Frames that have been converted to signals are transmitted via the relay device 30 to other vehicle-mounted devices 20 (as examples, the second ECU 22 and the third ECU 23). The receiver circuit converts signals, which have been transmitted from another vehicle-mounted device 20 and inputted via the relay device 30 into the port 21c, into frames and outputs the frames to the MCU 21a.

As one example, the second ECU 22 is an ECU connected to an actuator (not illustrated) that controls the vehicle. Example actuators include a motor, an engine, and brakes. The second ECU 22 controls the actuator based on the frame F12 received from the first ECU 21.

The second ECU 22 includes an MCU 22a, a PHY unit 22b, and a port 22c. Since the MCU 22a, the PHY unit 22b, and the port 22c have the same configurations as the MCU 21a, the PHY unit 21b, and the port 21c of the first ECU 21, description thereof is omitted as appropriate. As one example, the MCU 22a generates a control signal for the actuator based on the measurement data included in the frame F12, and outputs the control signal to the actuator.

The third ECU 23 is an ECU connected to a vehicle-mounted display unit (not illustrated), such as a display or speakers. The third ECU 23 has various information displayed by the display unit based on the frame F13 received from the first ECU 21.

The third ECU 23 includes an MCU 23a, a PHY unit 23b, and a port 23c. Since the MCU 23a, the PHY unit 23b, and the port 23c have the same configurations as the MCU 21a, the PHY unit 21b, and the port 21c of the first ECU 21, description thereof is omitted as appropriate. As one example, the MCU 23a generates a display signal based on the measurement data included in the frame F13 and outputs the display signal to the display unit.

Note that the above-described functions of the first ECU 21, the second ECU 22 and the third ECU 23 are mere examples, and there are no particular limitations on the functions of the first ECU 21, the second ECU 22 and the third ECU 23. As one example, the first ECU 21, the second ECU 22, or the third ECU 23 is further connected to another vehicle-mounted device 20 without passing the relay device 30 and functions as a relay device (that is, a gateway ECU) that relays frames to the other vehicle-mounted device 20.

Configuration of Relay Device

The relay device 30 includes a plurality of PHY units 40, a plurality of ports 50, a switch unit 60, a control unit 70, and a power supply circuit 80.

The plurality of PHY units 40 are connected to the plurality of vehicle-mounted devices 20 via the ports 50. The plurality of PHY units 40 each have the same configuration.

Since the PHY units 40 have the same configuration as the PHY unit 21b of the first ECU 21, description thereof is omitted as appropriate. That is, the PHY unit 40 is a physical layer transceiver that is compliant with OPEN Alliance TC10, and includes a detection circuit, a transmitter circuit, and a receiver circuit (none of which are illustrated). The transmitter circuit converts frames inputted from the switch unit 60 into a three-level signal and outputs the signal to the port 50. The receiver circuit converts a signal inputted into the port 50 into frames and outputs the frames to the switch unit 60.

Hereinafter, to distinguish between them, the PHY unit 40 corresponding to the first ECU 21 will be referred to as appropriate as the "first PHY unit 41", and the port 50 between the first ECU 21 and the first PHY unit 41 will be referred to as appropriate as the "port 51".

In the same way, the PHY unit 40 corresponding to the second ECU 22 will be referred to as appropriate as the "second PHY unit 42", and the PHY unit 40 corresponding to the third ECU 23 will be referred to as appropriate as the "third PHY unit 43". Here, both the second PHY unit 42 and the third PHY unit 43 are examples of "predetermined PHY units" for the present disclosure. The port 50 between the second ECU 22 and the second PHY unit 42 will be referred to as appropriate as the "port 52", and the port 50 between the third ECU 23 and the third PHY unit 43 will be referred to as appropriate as the "port 53".

The switch unit 60 has an integrated circuit (a circuit including a computational circuit and a storage circuit) and functions as an L2 switch by performing various computations and processing. In functional terms, the switch unit 60 includes a frame relay unit 61 and a rule storage unit 62. The frame relay unit 61 is realized by the computational circuit executing a computer program stored in the storage circuit. As one example, the rule storage unit 62 is a non-volatile memory, such as flash memory.

The switch unit 60 is electrically connected to the plurality of PHY units 40. A frame inputted into a PHY unit 40 via a port 50 is inputted from the PHY unit 40 into the switch unit 60. Based on the destination MAC address (or "Media Access Control address") included in the frame, the frame relay unit 61 outputs the frame to another PHY unit 40 that is connected to the vehicle-mounted device 20 that is the destination of the frame.

The rule storage unit 62 stores rules for deciding whether a frame inputted from a PHY unit 40 into the switch unit 60 should be outputted from the switch unit 60 to the control unit 70. As one example, these rules are stored as follows as an ACL (Access Control List).

Examples of ACL-Based Control

From transmitter "first ECU 21" to address "second ECU 22": Output denied From transmitter "first ECU 21" to address "third ECU 23": Output permitted From transmitter "second ECU 22" to address "first ECU 21": Output denied From transmitter "second ECU 22" to address "third ECU 23": Output permitted From transmitter "third ECU 23" to address "first ECU 21": Output permitted From transmitter "third ECU 23" to address "second ECU 22": Output permitted For the ACL described above, a frame addressed to the third ECU 23 that has been inputted from the first ECU 21 into the switch unit 60 via the first PHY unit 41 is outputted from the switch unit 60 to the control unit 70 (that is, "output permitted"). On the other hand, a frame addressed to the second ECU 22 inputted from the first ECU 21 into the switch unit 60 is not outputted from the switch unit 60 to the control unit 70 (that is, "output denied").

In more detail, when the VLAN groups G1 and G2 are crossed (as one example, when a frame is transmitted from the first ECU 21 in the group G1 to the third ECU 23 in the group G2), the frame is outputted from the switch unit 60 to the control unit 70. On the other hand, when the VLAN groups G1 and G2 are not crossed (as one example, when a frame is transmitted from the first ECU 21 of the group G1 to the second ECU 22 of the group G1), the frame is not outputted from the switch unit 60 to the control unit 70.

As one example, the control unit 70 is constructed of an MCU including a computational processing unit (or CPU (Central Processing Unit)) and a memory. In functional terms, the control unit 70 includes a controller 71, a frame relay unit 72, and a frame storage unit 73. Note that the control unit 70 may be constructed of a unit with a larger computational scale than the MCU. As one example, the control unit 70 may include a GPU (Graphics Processing Unit).

The controller 71 and the frame relay unit 72 are realized by the computational processing unit executing a predetermined computer program stored in the memory. This computer program may be distributed in a state where the program is stored in a computer-readable recording medium, and can be installed in the control unit 70 from outside.

When a frame inputted from a PHY unit 40 into the switch unit 60 corresponds to an "output permitted" condition in the ACL stored in the rule storage unit 62, the frame is outputted from the switch unit 60 to the control unit 70. The frame relay unit 72 performs routing of the frame based on the destination IP address (Internet Protocol address) included in the frame. The frame relay unit 72 then outputs the frame to the switch unit 60 addressed to a PHY unit 40 that is connected to the vehicle-mounted device 20 which is the actual destination of the frame. That is, the frame relay unit 72 functions as an L3 switch.

As one example, the frame storage unit 73 is volatile memory such as RAM (Random Access Memory). Frames outputted from the switch unit 60 to the control unit 70 are temporarily stored in the frame storage unit 73.

The controller 71 controls each unit of the relay device 30 by outputting various control commands. As one example, the controller 71 performs control that monitors the operating states of the plurality of PHY units 40, control for switching the operating states of the PHY units 40 ("switching control"), control for outputting frames stored in the frame storage unit 73 ("transfer control"), control for changing rules stored in the rule storage unit 62 ("rule change control"), and control for requesting frame retransmission to a vehicle-mounted device 20 ("retransmission request control"). The content of specific control operations by the controller 71 will be described later.

The power supply circuit 80 is a circuit that converts power supplied from a power source (not illustrated). The power converted at the power supply circuit 80 is supplied to each part of the relay device 30. The power supply circuit 80 also turns the supplying of power to each part of the relay device 30 on and off.

As one example, when a PHY unit 40 enters the sleep state, the power supply circuit 80 turns off the supplying of power to the transmitter circuit and the receiver circuit included in that PHY unit 40. On the other hand, even when a PHY unit 40 has entered the sleep state, the power supply circuit 80 continues to supply power to the detection circuit of that PHY unit 40. By doing so, the detection circuit of the PHY unit 40 is capable of detecting a wakeup signal even in the sleep state.

Relaying Method

A relaying method according to the present embodiment will be described with reference to FIGS. 1 to 3.

Figure 2:
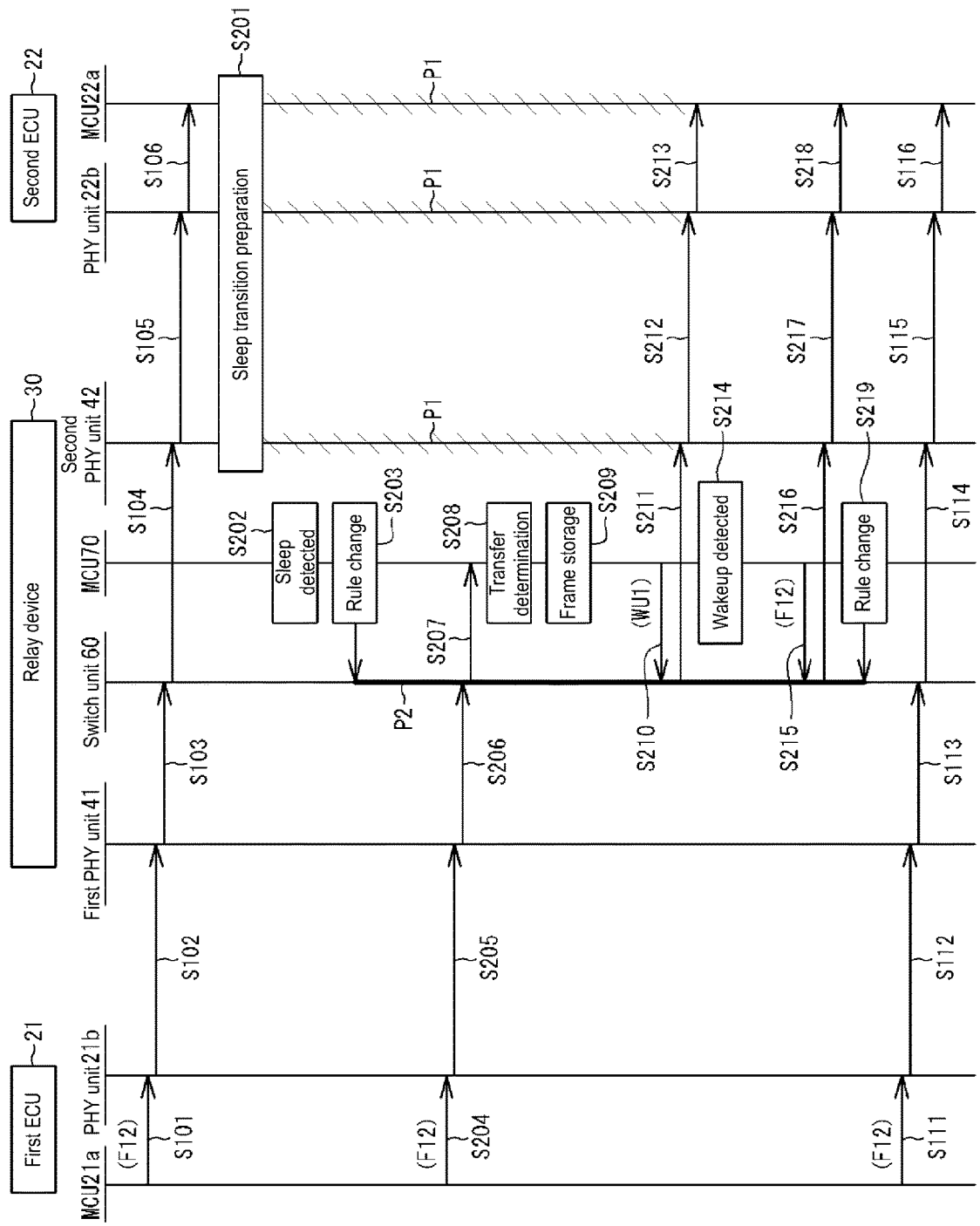
FIG. 2 is a sequence chart depicting one example of a relaying method according to an embodiment of the present disclosure.

FIG. 2 is a sequence diagram illustrating an example of a relaying method according to the present embodiment.

Figure 3:
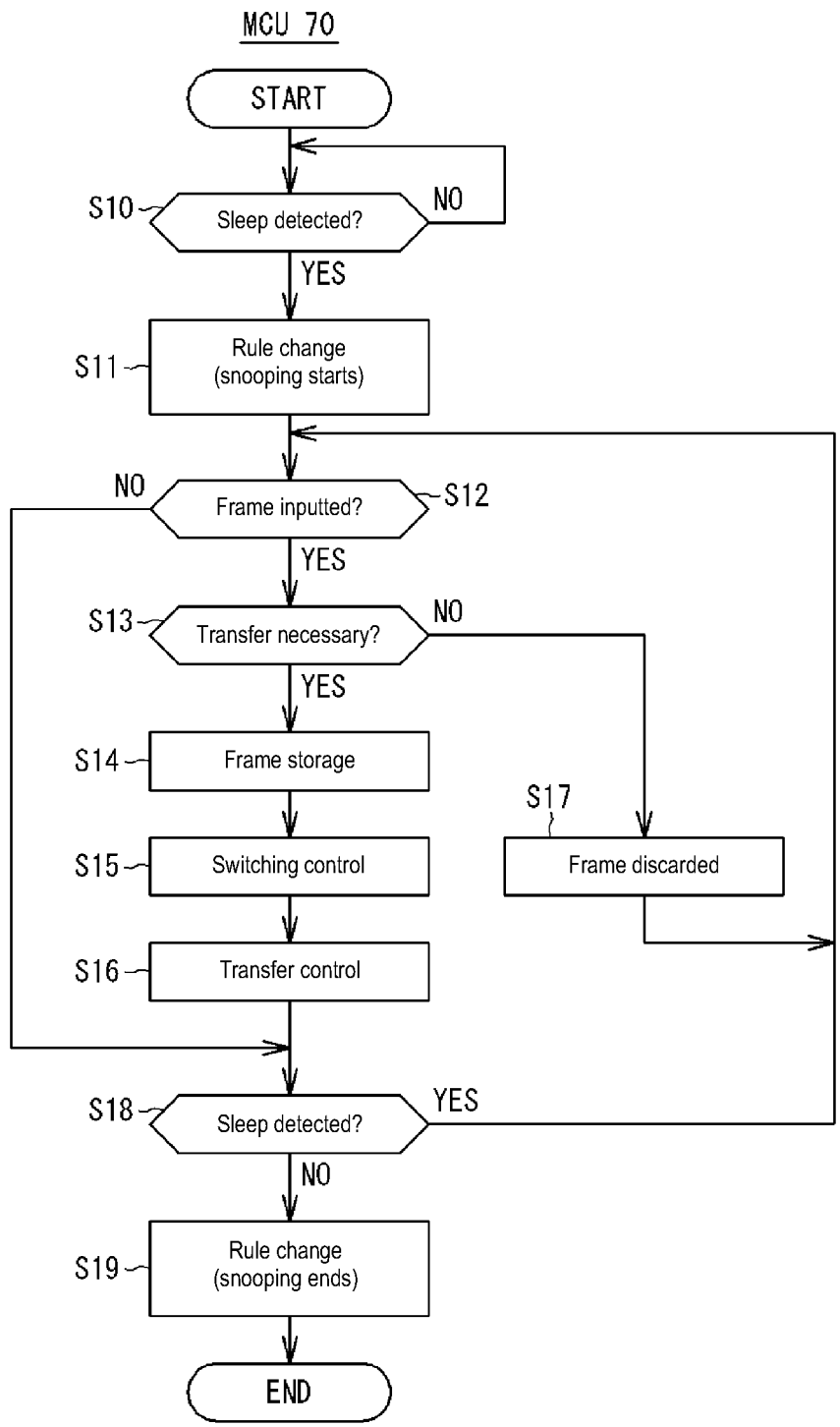
FIG. 3 is a flowchart depicting one example of a relaying method according to the present embodiment.

FIG. 3 is a flowchart depicting an example of a relaying method according to the present embodiment. The flowchart in FIG. 3 illustrates the operating procedure of the control unit 70.

An example where a frame F12 (Ethernet frame) addressed to the second ECU 22 is transmitted from the first ECU 21 to the second ECU 22 via the relay device 30 is described below. The following relaying method is realized by the various computers (the MCUs 21a and 22b, the switch unit 60, and the control unit 70) included in the relay system 10 reading out and executing computer programs from their respective memories.

When Each Part of the Relay System is in the Active State

First, transmission of a frame F12 when each part of the relay system 10 is in the active state will be described. The frame F12 is generated at the MCU 21a and is outputted from the MCU 21a to the PHY unit 21b (step S101). The frame F12 is then converted into a predetermined signal at the PHY unit 21b and inputted via the ports 21c and 51 into the first PHY unit 41 (step S102). The first PHY unit 41 converts the predetermined signal into the frame F12 and outputs the frame F12 to the switch unit 60 (step S103).

Since the frame F12 is a frame for which outputting to the control unit 70 is denied by the ACL in the rule storage unit 62, the frame F12 is not outputted from the switch unit 60 to the control unit 70. The frame F12 inputted into the switch unit 60 is outputted by the frame relay unit 61 to the second PHY unit 42 (step S104) and then transmitted from the second PHY unit 42 to the PHY unit 22b (step S105). The frame F12 is finally inputted from the PHY unit 22b into the MCU 22a.

In this way, when each part of the relay system 10 is in the active state, the frame F12 is transmitted as indicated in steps S101 to S106 from the first ECU 21 to the second ECU 22 via the relay device 30 with no particular obstructions.

When Part of the Relay System is in the Sleep State

Transition to Sleep State

As described earlier, although each unit included in the relay system 10 is normally in the active state, units are placed into the sleep state as appropriate to suppress power consumption. In the present embodiment, an example case where the second ECU 22 and the second PHY unit 42 enter the sleep state will be described.

The second ECU 22 switches from the active state to the sleep state in response to a predetermined sleep condition being satisfied. There are no particular limitations on this sleep condition, but as examples, the condition may be an active condition, such as a user pressing a sleep button (not illustrated), or may be a passive condition, such as the second ECU 22 not receiving Ethernet frames continuously for a predetermined period.

Since the PHY unit 22b is compliant with TC10, the PHY unit 22b in the active state periodically outputs a wakeup signal to the second PHY unit 42. In the same way, in the active state, the second PHY unit 42 periodically outputs a wakeup signal to the PHY unit 22b.

When the second PHY unit 42 has received a wakeup signal from the PHY unit 22b, the detection circuit included in the second PHY unit 42 detects the wakeup signal. If the second PHY unit 42 is in the active state at this time, the second PHY unit is maintained in the active state. If the second PHY unit 42 is in the sleep state, the second PHY unit switches from the sleep state to the active state.

On the other hand, when the second PHY unit 42 in the active state has not received a wakeup signal continuously for a predetermined period (for example, a period that is three times the cycle at which the PHY unit 22b outputs the wakeup signal), the second PHY unit 42 switches to the sleep state.

In the same way, when the PHY unit 22b has received a wakeup signal from the second PHY unit 42, the detection circuit included in the PHY unit 22b detects the wakeup signal and places the PHY unit 22b in the active state. Also, when the PHY unit 22b in the active state has not received a wakeup signal continuously for a predetermined period of time, the PHY unit 22b switches to the sleep state.

When a predetermined sleep condition is satisfied, sleep transition preparation (step S201) is commenced. First, the second ECU 22 (that is, the MCU 22a and the PHY unit 22b) enters the sleep state. In this sleep state, the PHY unit 22b does not output a wakeup signal. This means that the second PHY unit 42 will not receive a wakeup signal continuously for a predetermined period of time and the second PHY unit 42 will also switch to the sleep state. As a result, the second ECU 22 and the second PHY unit 42 enter the sleep state. In FIG. 2, the period corresponding to the sleep state is indicated as "sleep period P1".

In a conventional configuration, when a frame is transmitted to the second ECU 22 in a sleep state, the relay device 30 is not capable of relaying the frame due to the second PHY unit 42 being in the sleep state, resulting in frame loss. In contrast, in the present embodiment, the relay system 10 executes steps S202 to S218 described below to prevent such frame loss.

Commencement of Snooping

The following description refers to FIG. 2 and FIG. 3 as appropriate.

The controller 71 of the control unit 70 constantly monitors the operating state of at least one PHY unit 40 out of the plurality of PHY units 40 (step S10). In more detail, the controller 71 monitors whether the PHY unit 40 is in a sleep state. If none of the PHY units 40 is in the sleep state (that is, every PHY units 40 is in the active state), the controller 71 continues the monitoring (the "NO" route from step S10).

If any of the PHY units 40 is in the sleep state (the "YES" route from step S10, step S202), the controller 71 changes the rules relating to the PHY unit 40 in the sleep state, out of the rules stored in the rule storage unit 62 (rule changing control: step S11, step S203).

In the example in FIG. 2, the controller 71 detects that the second PHY unit 42 is in the sleep state. When an Ethernet frame (for example, the frame F12) addressed to the second ECU 22 connected to the second PHY unit 42 that is in the sleep state is inputted into the switch unit 60, the controller 71 changes the content of the ACL so that the Ethernet frame in question is outputted from the switch unit 60 to the control unit 70. That is, the control unit 70 sets every control operation in the ACL that has the second ECU 22 as the address at "output permitted". An example of ACL control after this change is indicated below.

Examples of ACL-Based Control After Change

From transmitter "first ECU 21" to address "second ECU 22": (Changed to) Output permitted From transmitter "first ECU 21" to address "third ECU 23": Output permitted From transmitter "second ECU 22" to address "first ECU 21": Output denied From transmitter "second ECU 22" to address "third ECU 23": Output permitted From transmitter "third ECU 23" to address "first ECU 21": Output permitted From transmitter "third ECU 23" to address "second ECU 22": Output permitted Due to the rule change, the frame F12, which would not be outputted to the control unit 70 before the change, is now outputted to the control unit 70. This enables the control unit 70 to peek (snoop) into the content of the frame F12 that could not be grasped before the change. Hereinafter, the period from the rule change in step S203 to the rule change in step S218 described later (which is a change back to the original rule) is referred to as a "snooping period P2".

Frame Transmission During Snooping Period

A case where the frame F12 is transmitted from the first ECU 21 to the relay device 30 during the snooping period P2 will now be described. After the rule change, the controller 71 monitors whether a normal frame addressed to a vehicle-mounted device 20 connected to a PHY unit 40 in the sleep state has been inputted into the control unit 70 (step S12). In the example in FIG. 2, the controller 71 monitors whether an Ethernet frame (for example, the frame F12) addressed to the second ECU 22 has been inputted into the control unit 70.

If no Ethernet frame has been inputted (the "NO" route from step S12), the controller 71 monitors whether the PHY units 40 that were detected as being in the sleep state in step S10 continue to be in the sleep state (step S18). If the PHY unit 40 that was detected as being in the sleep state in step S10 continues to be in the sleep state (the "YES" route from step S18), the controller 71 returns to step S12 and again monitors whether an Ethernet frame addressed to the second ECU 22 has been inputted.

In the example in FIG. 2, since the sleep period P1 of the second PHY unit 42 continues until step S211, described later, the controller 71 repeats step S12 to step S18 until an Ethernet frame addressed to the second ECU 22 is inputted.

The frame F12 is inputted from the MCU 21a into the switch unit 60 via the PHY unit 21b and the first PHY unit 41 (steps S204, S205, and S206). After this, since it is currently the snooping period P2, the frame F12 is outputted from the switch unit 60 to the control unit 70 (step S207).

On detecting that the frame F12 addressed to the second ECU 22 has been inputted (the "YES" route from step S12), the controller 71 determines whether it is necessary to transfer the frame F12 to the second ECU 22 that is currently in the sleep state (step S13). As one example, the controller 71 determines such transferring is necessary when a first predetermined condition (or "transfer condition") is satisfied. As examples, the first predetermined condition includes the priority of the data included in the frame F12 being a predetermined level or higher or the type of data included in the frame F12 being a predetermined type.

If the priority of the data included in the frame F12 is equal to or higher than the predetermined level, there is a high need to transfer the frame F12. For this reason, in this case, the frame F12 is stored in the frame storage unit 73 in steps S14, S15, and S16, described later, the second ECU 22 in the sleep state is woken up, and the frame F12 is transmitted to the second ECU 22. On the other hand, if the priority of the data included in the frame F12 is lower than the predetermined level, there is little need to wake up the second ECU 22 in the sleep state and transfer the frame F12. In this case, priority is given to suppressing power consumption in the relay system 10 by keeping the second PHY unit 42 and the second ECU 22 in the sleep state, and transferring of the frame F12 is not performed.

As one example, the priority of the data included in the frame F12 is a priority related to the driving safety of the vehicle, with one example being ASIL (Automotive Safety Integrity Level) according to ISO 26262.

In addition, if the type of data included in the frame F12 is a predetermined type with a high priority, since there is a high need to transfer the frame F12, in the same way as described above, the second ECU 22 in the sleep state is woken up and the frame F12 is transmitted to the second ECU 22. Example types of high-priority data include types related to vehicle control (automatic braking control for collision prevention, control that suppresses moving-off errors or reversing errors) and types related to warnings.

If the first predetermined condition is not satisfied for the frame F12 (the "NO" route from step S13), the controller 71 discards the frame F12 (step S17) and returns to step S12.

If the first predetermined condition is satisfied for the frame F12 (the "YES" route from step S13, step S208), the controller 71 stores the frame F12 in the frame storage unit 73 (step S14, step S209), and after this, the controller 71 executes switching control for switching the PHY unit 40 (the second PHY unit 42) that was detected in step S10 as being in the sleep state from the sleep state to the active state (step S15).

In more detail, the controller 71 generates a frame WU1 (one example of a "sleep control frame") including a wakeup signal and outputs the frame WU1 to the switch unit 60 (step S210). Next, the switch unit 60 outputs the frame WU1 to the second PHY unit 42 (step S211). When the detection circuit of the second PHY unit 42 detects the wakeup signal included in the frame WU1, the second PHY unit 42 switches from the sleep state to the active state.

Next, the second PHY unit 42, which has entered the active state, outputs a wakeup signal to the PHY unit 22*b* (step S212). After this, the second PHY unit 42 periodically outputs a wakeup signal to the PHY unit 22*b*.

When the detection circuit of the PHY unit 22*b* detects the wakeup signal, the PHY unit 22*b* switches from the sleep state to the active state. Next, the frame WU1 including the wakeup signal is outputted from the PHY unit 22*b* to the MCU 22*a* (step S213), and the MCU 22*a* switches from the sleep state to the active state. The series of steps depicted in steps S210 to S213 described above are steps that form a pair with the sleep transition preparation in step S201, and are referred to as "wakeup transition preparation". Due to the steps described above, the sleep period P1 of the second PHY unit 42 and the second ECU 22 ends.

After outputting the frame WU1 in step S210, the controller 71 monitors whether the second PHY unit 42 is in the active state (that is, whether the second PHY unit 42 has woken up) (step S214). If the second PHY unit 42 is not in the active state even after a predetermined time has passed, the controller 71 retransmits the frame WU1 to the switch unit 60.

When the controller 71 detects that the second PHY unit 42 is in the active state, the controller 71 ends the switching control (step S15) and executes transfer control that outputs the frame F12 stored in the frame storage unit 73 toward the second PHY unit 42 (step S16).

In more detail, the controller 71 outputs the frame F12 stored in the frame storage unit 73 to the switch unit 60 (step S215). After this, the frame F12 is outputted from the switch unit 60 to the second PHY unit 42 (step S216), and is then outputted from the second PHY unit 42 to the PHY unit 22*b* (step S217) and outputted from the PHY unit 22*b* to the MCU 22*a* (step S218). By doing so, the frame F12 stored in the frame storage unit 73 is transferred from the control unit 70 to the second ECU 22.

In a conventional configuration, the frame F12 is transmitted from the first ECU 21 to the second ECU 22 without passing via the control unit 70 (steps S101 to S106). In this case, when the second PHY unit 42 enters the sleep state, the frame F12 cannot be relayed by the relay device 30, which in the past has resulted in frame loss.

On the other hand, when the second PHY unit 42 is in the sleep state, the control unit 70 according to the present embodiment changes the ACL in the rule storage unit 62 to monitor the frame F12 (that is, the frame F12 addressed to the second ECU 22) that is intended to be outputted from the second PHY unit 42. When a frame F12, which is an Ethernet frame to be transmitted from a PHY unit 40 in the sleep state and has a high need to be transferred, has been inputted, the control unit 70 switches the second PHY unit 42 to the active state. By using this configuration, the PHY units 40 can appropriately enter the sleep state to suppress power consumption and the PHY units 40 can be woken up when necessary so that relaying can be performed in a timely manner.

In addition, the control unit 70 temporarily stores the frame F12 and, after the second PHY unit 42 has been woken up and transferring of the frame F12 has become possible, transfers (or "proxy transfers") the frame F12 to the second ECU 22 in place of the first ECU 21. This means that frame loss can be suppressed.

Since the control unit 70 transfers the frame F12 stored in the frame storage unit 73 to the second ECU 22 after the second PHY unit 42 has woken up, there is no need to retransmit the frame F12 from the first ECU 21 to the relay device 30. This means that it is possible to reduce the communication load involved in retransmitting the frame F12.

Also, when retransmission of the frame F12 from the first ECU 21 to the relay device 30 is performed, depending on the timing, there is the risk of transmission of the frame F12 being delayed, so that it may take time for the second ECU 22 to receive the frame F12. On the other hand, in the present embodiment, since the control unit 70 transfers the frame F12 to the second ECU 22, the time taken until the second ECU 22 receives the frame F12 can be further shortened.

After the transfer control (step S16), the controller 71 monitors whether the PHY unit 40 (the second PHY unit 42 in the example in FIG. 2) that was detected as being in the sleep state in step S10 continues to be in the sleep state (step S18). When the controller 71 has detected in step S18 that the PHY unit 40 (the second PHY unit 42) being monitored is not in the sleep state (that is, the PHY unit 40 is in the active state) (the "NO" route from step S18), the controller 71 changes the rules stored in the rule storage unit 62 (steps S19, S219). In more detail, the controller 71 restores the rules regarding the PHY unit 40 (the second PHY unit 42) that was detected as no longer being in the sleep state in step S18 to the state before the change in step S11.

Due to the rule changes in steps S19 and S218, the frame F12 inputted into the switch unit 60 is no longer outputted to the control unit 70. This ends the peeking (snooping) at the content of the frame F12 by the control unit 70. That is, the snooping period P2 ends.

Frame Transmission After End of Snooping Period

When the frame F12 has been outputted from the first ECU 21 following the end of the snooping period P2, the frame F12 is transmitted to the second ECU 22 on the same route as in steps S101 to S106 described above (that is, without passing via the control unit 70).

That is, the frame F12 is outputted from the MCU 21a to the PHY unit 21b (step S111), passes via the first PHY unit 41, the switch unit 60, and the second PHY unit 42 (steps S112, S113, and S114) and is transmitted to the PHY unit 22b (step S115), and is finally outputted from the PHY unit 22b to the MCU 22a (step S116).

First Modification: Retransmission Control

A first modification to the present embodiment will now be described. In this first modification, configurations that are the same as in the embodiment described above have been assigned the same reference numerals and description thereof is omitted. In this first modification, the hardware configuration of the relay system 10 is the same as in the embodiment described above.

Figure 4:
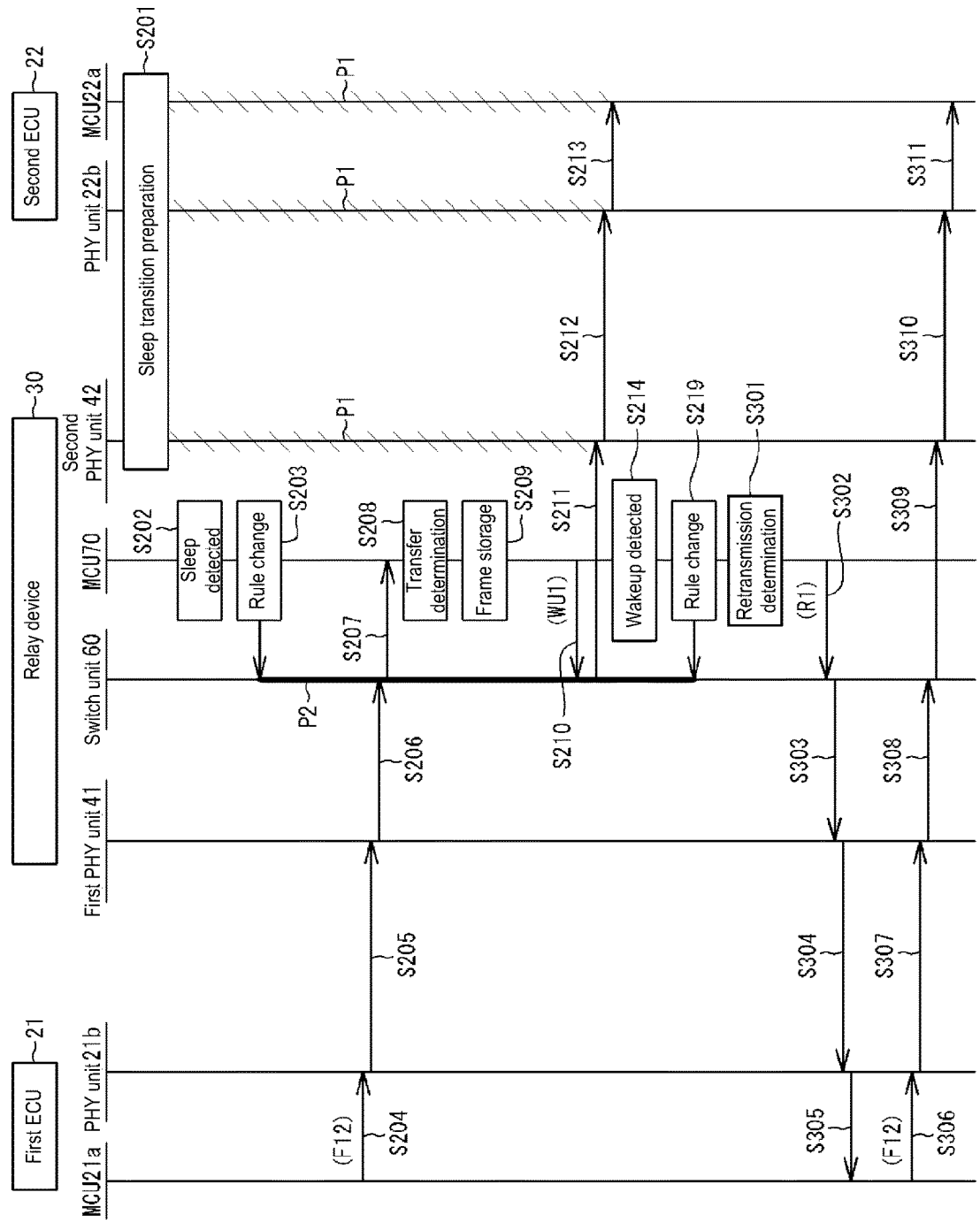
FIG. 4 is a sequence chart depicting a relaying method according to a modification.

FIG. 4 is a sequence diagram depicting a relaying method according to the first modification.

Figure 5:
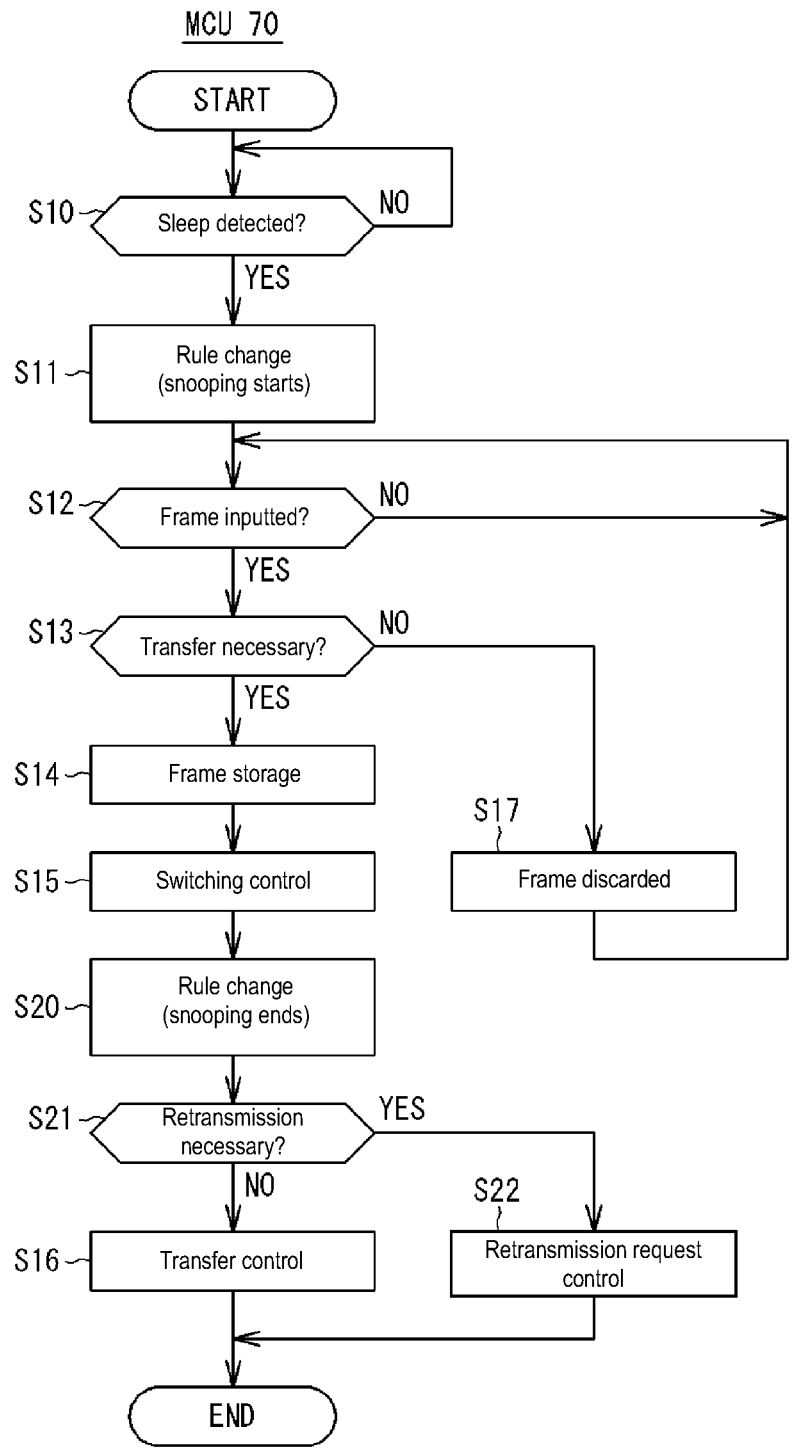
FIG. 5 is a flowchart depicting a relaying method according to the modification.

FIG. 5 is a flowchart depicting a relaying method according to the first modification. The flowchart in FIG. 5 indicates the operating procedure of the control unit 70.

Since the relaying method according to the first modification is the same as the embodiment described above up to the point where the control unit 70 executes the switching control (steps S10 to S15, S17, and steps S201 to S213), description thereof is omitted.

In the embodiment described above, after the control unit 70 has woken up the second PHY unit 42, the control unit 70 performs transfer control to output the frame F12 stored in the frame storage unit 73 to the second ECU 22. On the other hand, in this first modification, after the control unit 70 has woken up the second PHY unit 42 in step S15, first, the rule stored in the rule storage unit 62 is restored (step S20, step S219). As a result, the snooping period P2 ends, and the frame F12 inputted to the switch unit 60 is no longer outputted to the control unit 70.

After this, the control unit 70 determines whether it is necessary to retransmit the frame F12 from the first ECU 21 (step S21), and depending on the determination, the control unit 70 performs transfer control (step S16) or retransmission request control (step S22).

In more detail, the control unit 70 determines whether a second predetermined condition (or "retransmission condition") is satisfied, and when the second predetermined condition is satisfied, determines that it is necessary to retransmit the frame F12. As examples, the second predetermined condition includes (A), (B), or (C) below. Note that the following conditions are mere examples, and the second predetermined condition may include other conditions.

Examples of Second Predetermined Conditions (A) The type of data included in the frame F12 is a predetermined type.

(B) The amount of data in the frame F12 exceeds a predetermined amount.

(C) The frame F12 is one of a plurality of divided frames.

As described in the above embodiment, when proxy transfer of the frame F12 from the relay device 30 to the second ECU 22 is performed (step S16, steps S215 to S218), compared to when the frame F12 is retransmitted from the first ECU 21, the frame F12 can be delivered to the second ECU 22 in a short time and with a reduced communication load.

On the other hand, since proxy transfer requires the frame F12 to be temporarily stored in the frame storage unit 73, proxy transfer cannot be performed if the amount of data in the frame F12 exceeds the available space in the frame storage unit 73. Also, when a plurality of frames to be proxy-transferred are inputted into the relay device 30, it is favorable for low-priority frames F12 to be retransmitted instead so that high-priority frames can be proxy-transferred in a shorter time. For this reason, a condition that retransmission is preferable to proxy transfer is set as a second predetermined condition for the frames F12.

In more detail, when the condition (A) above is satisfied, since there is little need to proxy-transfer the frame F12, the control unit 70 requests the first ECU 21 to retransmit the frame F12. Also, when the condition (B) above is satisfied, it is not possible to store the entire frame F12 in the frame storage unit 73, which means that proxy transfer cannot be performed. For this reason, in this case also, the control unit 70 makes a retransmission request to the first ECU 21.

If the frame F12 is one of a plurality of divided frames, this means that the amount of data before division was large and there is a high risk of the frame storage unit 73 being incapable of storing the plurality of divided frames in their entirety. Since the plurality of divided frames need to be combined at the destination, it is preferable to transmit the divided frames together. For this reason, when the condition (C) above is satisfied, the control unit 70 makes a retransmission request to the first ECU 21. As one example, the frame F12 is the first frame to reach the relay device 30 out of the plurality of divided frames.

When the second predetermined condition is satisfied for the frame F12 (the "YES" route from step S21, step S301), the controller 71 performs retransmission request control to request the first ECU 21 to retransmit the frame F12 (step S22). In more detail, the controller 71 generates a frame R1 including a retransmission request signal, and outputs the frame R1 toward the first ECU 21.

The frame R1 is outputted from the control unit 70 to the switch unit 60 (step S302), passes from the switch unit 60 via the first PHY unit 41 and the PHY unit 21b (steps S303 and S304), and is inputted into the MCU 21a (step S305).

Based on the frame R1, the MCU 21a again outputs the frame F12 toward the second ECU 22. The frame F12 is inputted from the MCU 21a into the MCU 22a via the PHY unit 21b, the first PHY unit 41, the switch unit 60, the second PHY unit 42 and the PHY unit 22b (steps S306 to S311).

According to this modification, since it is possible to switch between performing transfer control and performing retransmission request control according to whether the second predetermined condition is satisfied, it is possible to relay frames favorably and more in keeping with various conditions.

Note that in this modification, the retransmission request control (step S22) may be performed immediately after the rule change control (step S20) without performing determination of whether the second predetermined condition is satisfied (step S21) and transfer control (step S16). As one example, in the relay system 10, when the need for proxy transfer is low, it is favorable to perform only retransmission request control without selecting between transfer control and retransmission request control since this reduces the processing load at the relay device 30.

Second Modification: No Rule Changes

A second modification to the present embodiment will now be described. In this second modification, configurations that are the same as in the embodiment described above have been assigned the same reference numerals and description thereof is omitted. In this second modification, the hardware configuration of the relay system 10 is the same as in the above embodiment.

Figure 6:
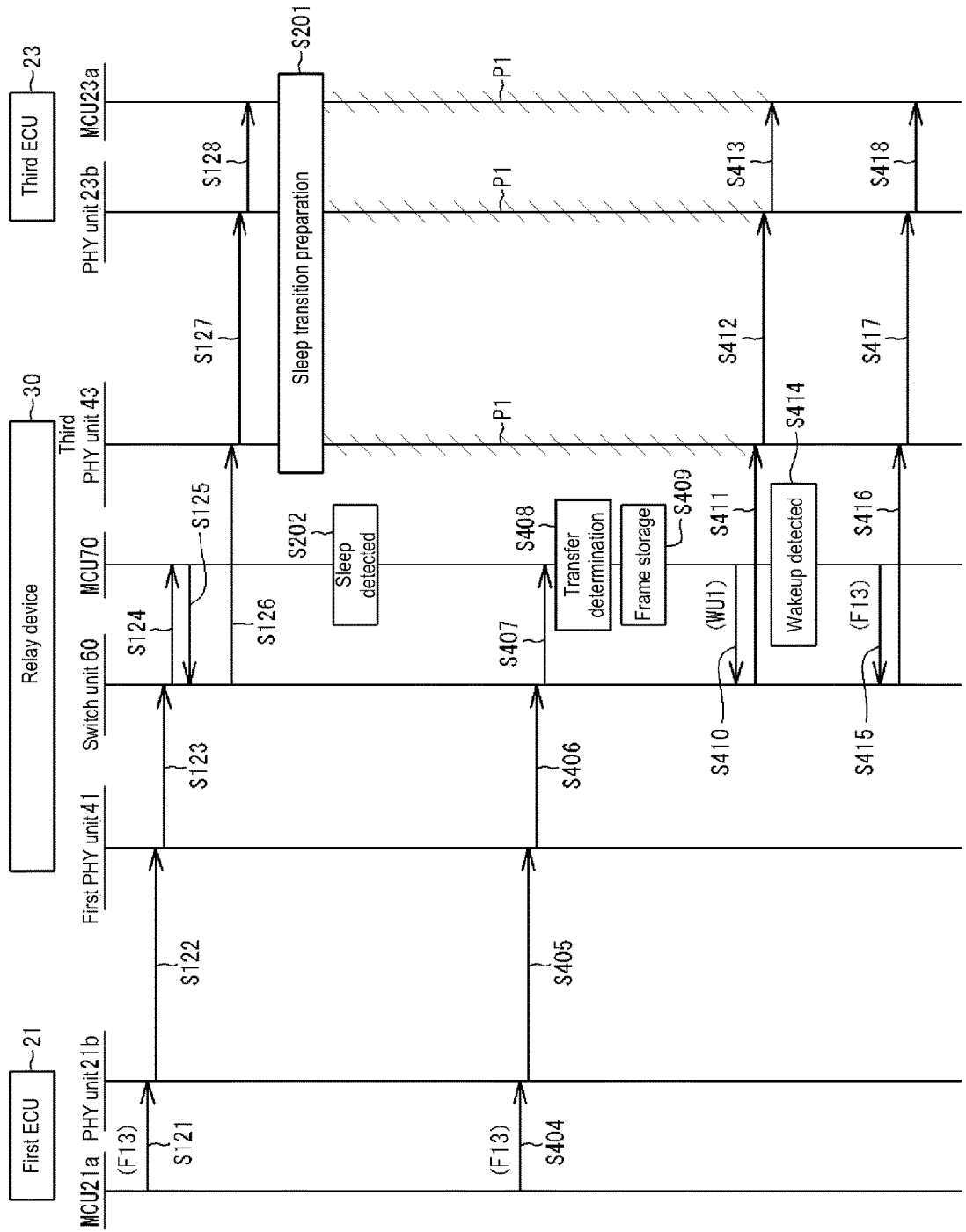
FIG. 6 is a sequence chart depicting a relaying method according to another modification.

FIG. 6 is a sequence chart depicting a relaying method according to the second modification.

Figure 7:
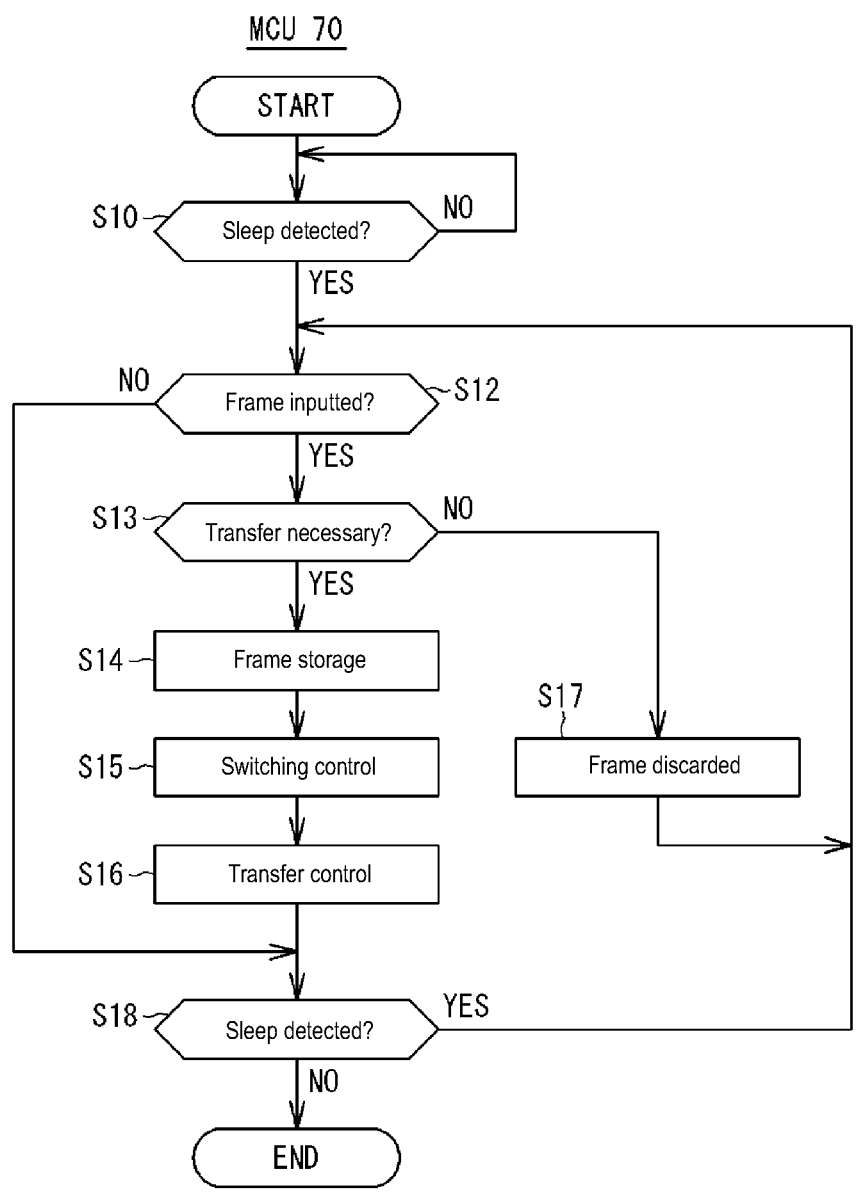
FIG. 7 is a flowchart depicting a relaying method according to the other modification.

FIG. 7 is a flowchart depicting the relaying method according to the second modification. The flowchart in FIG. 7 indicates the operating procedure of the control unit 70.

In the embodiment described above, a case where the frame F12 is transmitted from the first ECU 21 to the second ECU 22 is given as an example. In this second modification, a case where the frame F13 is transmitted from the first ECU 21 to the third ECU 23 will be described.

Since the first ECU 21 and the second ECU 22 belong to the same VLAN group G1, the frame F12 can be relayed by the switch unit 60 as an L2 switch, so that the frame F12 is not outputted to the control unit 70 until snooping starts in step S203. On the other hand, since the first ECU 21 and the third ECU 23 belong to the different VLAN groups G1 and G2, respectively, it is necessary to relay the frame F13 with the frame relay unit 72 as an L3 switch, and the frame F13 is outputted to the control unit 70 even before snooping starts in step S203.

For this reason, in the relaying method according to the second modification, steps corresponding to steps S11 and S19 for changing rules in the above embodiment are omitted. This reduces the processing load of the relay device 30 while suppressing loss of the frame F13.

When Each Part of the Relay System is in the Active State

The following describes how the frame F13 is transmitted when each part of the relay system 10 is in the active state. In the same way as the frame F12, the frame F13 is outputted from the MCU 21a and inputted into the switch unit 60 via the PHY unit 21b and the first PHY unit 41 (steps S121, S122, and S123).

Since the frame F13 transmitted from the first ECU 21 to the third ECU 23 is indicated as "output permitted" to the control unit 70 in the ACL in the rule storage unit 62, the switch unit 60 outputs the frame F13 to the control unit 70 (step S124).

The frame relay unit 72 of the control unit 70 then performs routing, so that after the frame F13 has been outputted from the control unit 70 to the switch unit 60 (step S125), the frame F13 is outputted from the switch unit 60 to the third PHY unit 43 (step S126). The frame F13 passes from the third PHY unit 43 via the PHY unit 23b (step S127) and is inputted into the MCU 23a (step S128).

In this way, when each unit in the relay system 10 is in the active state, the frame F13 is transmitted as indicated in steps S121 to S128 from the first ECU 21 to the third ECU 23 via the relay device 30 (that is, the switch unit 60 and the control unit 70) with no particular obstructions.

When Part of the Relay System is in the Sleep State

In the same way as the second ECU 22 and the second PHY unit 42, the third ECU 23 and the third PHY unit 43 perform the sleep transition preparation (step S201). That is, in keeping with a predetermined sleep condition being satisfied, the third ECU 23 enters the sleep state, so that outputting of the wake-up signal from the PHY unit 23b to the third PHY unit 43 stops. Since the wakeup signal is not received at the third PHY unit 43 continuously for a predetermined period, the third PHY unit 43 also switches to the sleep state. By doing so, the sleep period P1 of the third ECU 23 and the third PHY unit 43 starts.

In the same way as the embodiment described above, the controller 71 constantly monitors whether the PHY units 40 are in the sleep state (step S10). In this modification, the controller 71 then detects that the third PHY unit 43 is in the sleep state (the "YES" route from step S10, step S202).

After this, the controller 71 executes normal monitoring of frames in step S12 without performing the rule change control (that is, steps S11 and S203) in the embodiment described above. That is, the controller 71 monitors whether an Ethernet frame (for example, frame F13) that is addressed to the third ECU 23 connected to the third PHY unit 43 has been inputted into the control unit 70.

After the frame F13 has been inputted from the MCU 21a via the PHY unit 21b and the first PHY unit 41 into the switch unit 60 (steps S404, S405, and S406), the frame F13 is outputted from the switch unit 60 to the control unit 70 (step S407).

Next, the controller 71 executes steps S13 to S18 in the same way as the embodiment described above. That is, when the controller 71 has detected that the frame F13 that is addressed to the third ECU 23 has been inputted (the "YES" route from step S12), the controller 71 determines whether it is necessary to transfer the frame F13 to the third ECU 23 that is presently in the sleep state (step S13). When transferring is unnecessary (the "NO" route from step S13), the controller 71 discards the frame F13 (step S17) and returns to step S12.

If transferring of the frame F13 is necessary (the "YES" route from step S13, step S408), the controller 71 stores the frame F13 in the frame storage unit 73 (steps S14, S409). After this, the controller 71 executes switching control that switches the PHY unit 40 (the third PHY unit 43), which was detected in step S10 as being in the sleep state, from the sleep state to the active state (step S15).

In more detail, the controller 71 generates a frame WU1 (one example of a "sleep control frame") including a wakeup signal. The frame WU1 is outputted from the control unit 70 and inputted via the switch unit 60 into the third PHY unit 43, which switches the third PHY unit 43 to the active state (steps S410 and S411).

After this, the third PHY unit 43 outputs a wakeup signal to the PHY unit 23b (step S412), which switches the PHY unit 23b to the active state. Next, a frame WU1 including a wakeup signal is outputted from the PHY unit 23b to the MCU 23a (step S413), which switches the MCU 23a to the active state. Due to the steps described above, the sleep period P1 of the third PHY unit 43 and the third ECU 23 ends.

After outputting the frame WU1 in step S410, the controller 71 monitors whether the third PHY unit 43 is in the active state (that is, whether the third PHY unit 43 has woken up) (step S414). If the third PHY unit 43 is not in the active state even after a predetermined time has passed, the controller 71 retransmits the frame WU1 to the switch unit 60.

When the controller 71 detects that the third PHY unit 43 is in the active state, the controller 71 ends the switching control (step S15) and executes transfer control that outputs the frame F13 stored in the frame storage unit 73 toward the third PHY unit 43 (step S16). The frame F13 is inputted from the control unit 70 into the MCU 23a via the switch unit 60, the third PHY unit 43, and the PHY unit 23b (steps S415 to S418).

In this way, the control unit 70 temporarily stores the frame F13, and after the third PHY unit 43 has woken up and transferring of the frame F13 has become possible, transfers the frame F13 to the third ECU 23 in place of the first ECU 21 (proxy transfer). This means that there is no need to retransmit the frame F13 from the first ECU 21 to the relay device 30, and frame loss can be suppressed while reducing the communication load involved in retransmission of the frame F13.

After the transfer control (step S16), the controller 71 monitors whether the PHY unit 40 (the third PHY unit 43) that was detected as being in the sleep state in step S10 continues to be in the sleep state (step S18).

When it has been detected that the PHY unit 40 (the third PHY unit 43) is not in the sleep state (that is, the PHY unit 40 is in the active state) (the "NO" route from step S18), the specified relaying method ends without the rule change control (step S19, step S219) in the above embodiment being performed.

As described above, in the relaying method according to the second modification, since steps corresponding to steps S11 and S19 for the rule change in the embodiment described above are omitted, the processing load in the relay device 30 can be reduced while the loss of the frame F13 is suppressed.

Other Modifications
Order of Steps

The relaying method described in the above embodiments and various modifications are mere examples, and the respective steps in the relaying methods described above may be reordered as appropriate. As one example, in the above embodiment, proxy transfer of frame F12 by the control unit 70 (steps S215 to S218) is executed prior to the rule change (step S219) by the control unit 70.

However, the proxy transfer (steps S215 to S218) by the control unit 70 may be executed after the rule change (step S219) by the control unit 70. As one example, the control unit 70 may execute the rule change (step S219) in parallel with the outputting of the frame WU1 to the second PHY unit 42.

Modification of Sleep Control Frame

In the embodiment described above, the PHY unit 40 switches from the operating state to the sleep state with continuous non-reception of a wakeup signal for a predetermined period as the trigger. That is, the sleep control frame includes a wakeup signal, and the PHY unit 40 enters the sleep state because it "has not received" a sleep control frame.

However, the PHY unit 40 may switch from the active state to the sleep state with reception of a sleep signal as a trigger. That is, the sleep control frame includes a sleep signal and the PHY unit 40 enters the sleep state because it "has received" a sleep control frame. In this case, the PHY unit 40 may switch from the sleep state to the active state with continuous non-reception of the sleep signal for a predetermined period as the trigger, or may switch from the sleep state to the active state with reception of the wakeup signal as the trigger.

APPENDIX

Note that the above embodiment and the various modifications can be freely combined, at least in part. Also, all features of the embodiment and modifications disclosed here are exemplary and should not be regarded as limitations on the present disclosure. The scope of the present disclosure is indicated by the range of the patent claims and is intended to include all changes within the meaning and scope of the patent claims and their equivalents.

The invention claimed is:

1. A vehicle-mounted relay device for relaying Ethernet frames comprising:
    a plurality of PHY units corresponding to a plurality of vehicle-mounted devices;
    a switch unit to which the plurality of PHY units are connected; and
    a control unit configured to monitor operating states of the plurality of PHY units,
    wherein the plurality of PHY units include a predetermined PHY unit whose operating state switches between a sleep state and an active state in response to reception of a predetermined control signal that differs from the Ethernet frames, and
    when an Ethernet frame to be transmitted from the predetermined PHY unit has been detected during a period where the predetermined PHY unit is in the sleep state, the control unit executes switching control to switch the predetermined PHY unit to the active state, and
    wherein the control unit includes a frame storage unit configured to store the Ethernet frame to be transmitted from the predetermined PHY unit, and
    after executing the switching control, the control unit executes transfer control for outputting the Ethernet frame stored in the frame storage unit to the predetermined PHY unit.

2. The relay device according to claim 1,
    wherein the switching control and the transfer control are executed on a condition that the Ethernet frame to be transmitted from the predetermined PHY unit satisfies a first predetermined condition.

3. The relay device according to claim 2, wherein the first predetermined condition includes a condition that a priority, which relates to driving safety of a vehicle, of the data included in the Ethernet frame to be transmitted from the predetermined PHY unit is a predetermined level or higher.

4. The relay device according to claim 1, wherein when the Ethernet frame to be transmitted from the predetermined PHY unit satisfies a second predetermined condition, the control unit executes retransmission request control to request a transmitter of the Ethernet frame to retransmit the Ethernet frame without executing the transfer control.

5. The relay device according to claim 4, wherein the second predetermined condition includes:
    the type of data included in the Ethernet frame to be transmitted from the predetermined PHY unit being a predetermined type;
    an amount of data in the Ethernet frame to be transmitted from the predetermined PHY unit exceeding a predetermined amount; or
    the Ethernet frame to be transmitted from the predetermined PHY unit being one of a plurality of divided frames.

6. The relay device according to claim 1,
    wherein the switch unit includes a rule storage unit configured to store a rule for deciding whether the Ethernet frame to be transmitted from the predetermined PHY unit is to be outputted from the switch unit to the control unit, and
    when the predetermined PHY unit is in the sleep state, the control unit changes the rule so that the Ethernet frame to be transmitted from the predetermined PHY unit is outputted to the control unit.

7. The relay device according to claim 6,
    wherein the Ethernet frame to be transmitted from the predetermined PHY unit is a frame whose transmitter is a vehicle-mounted device belonging to the same VLAN (Virtual Local Area Network) as a vehicle-mounted device corresponding to the predetermined PHY unit out of the plurality of vehicle-mounted devices.

8. The relay device according to claim 1, wherein the Ethernet frame to be transmitted from the predetermined PHY unit is a frame whose transmitter is a vehicle-mounted device belonging to a VLAN (Virtual Local Area Network) that differs from the vehicle-mounted device corresponding to the predetermined PHY unit out of the plurality of vehicle-mounted devices.

9. The relay device according to claim 1, wherein the predetermined PHY unit is compliant with OPEN Alliance TC10 (Technical Committees 10).

10. A relay system comprising;
a relay device according to claim 1; and
the plurality of vehicle-mounted devices.

11. A relaying method in which a vehicle-mounted relay device relays Ethernet frames,
wherein the relay device includes:
a plurality of PHY units that correspond to a plurality of vehicle-mounted devices and include a predetermined PHY unit whose operating state is switched between a sleep state and an active state in response to reception of a predetermined control signal that differs from the Ethernet frames; and
a switch unit to which the plurality of PHY units are connected,
the relaying method comprising steps of:
detecting an Ethernet frame to be transmitted from the predetermined PHY unit during a period in which the predetermined PHY unit is in the sleep state; and
switching the predetermined PHY unit to the active state when the Ethernet frame has been detected, and
a frame storage unit configured to store the Ethernet frame to be transmitted from the predetermined PHY unit, and
after switching the predetermined PHY unit to the active state, transferring control for outputting the Ethernet frame stored in the frame storage unit to the predetermined PHY unit.

12. A computer program product for enabling a vehicle-mounted relay device to relay Ethernet frames, wherein the relay device includes: a plurality of PHY units that correspond to a plurality of vehicle-mounted devices and include a predetermined PHY unit whose operating state is switched between a sleep state and an active state in response to reception of a predetermined control signal that differs from the Ethernet frames; and a switch unit to which the plurality of PHY units are connected; the computer program product comprising a non-transitory, machine-readable medium storing instructions which, when executed by at least one programmable processor, causes at least one programmable processor to perform operations comprising:

detecting an Ethernet frame to be transmitted from the predetermined PHY unit during a period in which the predetermined PHY unit is in the sleep state; and
switching the predetermined PHY unit to the active state when the Ethernet frame has been detected, and
after the predetermined PHY unit to the active state when the Ethernet frame has been detected, the transferring control for outputting the Ethernet frame stored in the frame storage unit to the predetermined PHY unit.

13. A vehicle-mounted relay device for relaying Ethernet frames comprising:
a plurality of PHY units corresponding to a plurality of vehicle-mounted devices;
a switch unit to which the plurality of PHY units are connected; and
a control unit configured to monitor operating states of the plurality of PHY units,
wherein the plurality of PHY units include a predetermined PHY unit whose operating state switches between a sleep state and an active state in response to reception of a predetermined control signal that differs from the Ethernet frames, and
when an Ethernet frame to be transmitted from the predetermined PHY unit has been detected during a period where the predetermined PHY unit is in the sleep state, the control unit executes switching control to switch the predetermined PHY unit to the active state, and
wherein after executing the switching control, the control unit executes retransmission request control to request a transmitter of the Ethernet frame to retransmit the Ethernet frame to be transmitted from the predetermined PHY unit.

14. The relay device according to claim 13,
wherein the switch unit includes a rule storage unit configured to store a rule for deciding whether the Ethernet frame to be transmitted from the predetermined PHY unit is to be outputted from the switch unit to the control unit, and
when the predetermined PHY unit is in the sleep state, the control unit changes the rule so that the Ethernet frame to be transmitted from the predetermined PHY unit is outputted to the control unit.

15. The relay device according to claim 13, wherein the Ethernet frame to be transmitted from the predetermined PHY unit is a frame whose transmitter is a vehicle-mounted device belonging to a VLAN (Virtual Local Area Network) that differs from the vehicle-mounted device corresponding to the predetermined PHY unit out of the plurality of vehicle-mounted devices.

16. The relay device according to claim 13, wherein the predetermined PHY unit is compliant with OPEN Alliance TC10 (Technical Committees 10).

* * * * *